United States Patent
Koenig, II et al.

(10) Patent No.: US 10,571,611 B2
(45) Date of Patent: Feb. 25, 2020

(54) SPIN COATER FOR APPLYING MULTIPLE COATINGS TO AN OPTICAL SUBSTRATE

(71) Applicant: Transitions Optical, Inc., Pinellas Park, FL (US)

(72) Inventors: Jerry L. Koenig, II, Largo, FL (US); Willard Beamer, Palmetto, FL (US); Lex Eric Pace, Largo, FL (US)

(73) Assignee: Transitions Optical, Inc., Pinellas Park, FL (US)

( * ) Notice: Subject to any disclaimer, the term of this patent is extended or adjusted under 35 U.S.C. 154(b) by 735 days.

(21) Appl. No.: 15/026,620

(22) PCT Filed: Oct. 3, 2014

(86) PCT No.: PCT/US2014/058943
§ 371 (c)(1),
(2) Date: Apr. 1, 2016

(87) PCT Pub. No.: WO2015/054041
PCT Pub. Date: Apr. 16, 2015

(65) Prior Publication Data
US 2016/0243579 A1 Aug. 25, 2016

Related U.S. Application Data

(60) Provisional application No. 61/890,055, filed on Oct. 11, 2013, provisional application No. 61/890,045, (Continued)

(51) Int. Cl.
*B05C 11/08* (2006.01)
*B05C 11/10* (2006.01)
(Continued)

(52) U.S. Cl.
CPC ............... *G02B 5/223* (2013.01); *B05C 5/02* (2013.01); *B05C 11/08* (2013.01);
(Continued)

(58) Field of Classification Search
CPC ........................... B05C 11/08; B05C 11/1036
See application file for complete search history.

(56) References Cited

U.S. PATENT DOCUMENTS 5,002,008 A * 3/1991 Ushijima ................ B05C 11/08
118/313
5,094,884 A 3/1992 Hillman et al.
(Continued)

FOREIGN PATENT DOCUMENTS

CN 101111870 A 1/2008
JP 4162415 A 6/1992
(Continued)

*Primary Examiner* — Dah-Wei D. Yuan
*Assistant Examiner* — Stephen A Kitt
(74) *Attorney, Agent, or Firm* — The Webb Law Firm

(57) ABSTRACT

A spin coater that can be used to apply multiple coating compositions over an optical substrate, is described. The spin coater includes, a coater bowl configured to collect excess coating material expelled from an optical substrate being coated, a rotatable chuck configured to receive and rotate the optical substrate in the bowl during coating, a plurality of coating reservoirs, each containing a coating material, and an indexable coating reservoir platform containing the plurality of reservoirs and configured to index a selected reservoir into a dispensing position above the coater bowl. The spin coater can include or have associated therewith at least one curing station, in which each curing station is independently configured to cure at least partially at least one applied coating material. Each curing station can include at least one of a thermal curing station, a UV curing station, and/or an IR curing station.

14 Claims, 5 Drawing Sheets

Related U.S. Application Data filed on Oct. 11, 2013, provisional application No. 61/890,059, filed on Oct. 11, 2013.

(51) Int. Cl.

| | | |
|---|---|---|
| *G02B 5/22* | (2006.01) | |
| *B29D 11/00* | (2006.01) | |
| *G03C 1/73* | (2006.01) | |
| *C08G 18/62* | (2006.01) | |
| *C08G 18/78* | (2006.01) | |
| *C08G 18/80* | (2006.01) | |
| *C08G 18/81* | (2006.01) | |
| *C08G 18/22* | (2006.01) | |
| *C08G 18/28* | (2006.01) | |
| *C09D 175/06* | (2006.01) | |
| *C08G 18/40* | (2006.01) | |
| *C08G 18/44* | (2006.01) | |
| *G02B 1/14* | (2015.01) | |
| *C08J 7/04* | (2006.01) | |
| *C08J 7/12* | (2006.01) | |
| *C09D 5/32* | (2006.01) | |
| *G02B 5/23* | (2006.01) | |
| *G02C 7/10* | (2006.01) | |
| *B05D 3/14* | (2006.01) | |
| *B05D 7/00* | (2006.01) | |
| *C09K 9/02* | (2006.01) | |
| *B05C 5/02* | (2006.01) | |
| *B05C 13/00* | (2006.01) | |
| *B05D 1/00* | (2006.01) | |
| *B05D 3/00* | (2006.01) | |
| *B05D 3/02* | (2006.01) | |

(52) U.S. Cl.
CPC ...... *B05C 11/1036* (2013.01); *B05C 11/1039* (2013.01); *B05C 13/00* (2013.01); *B05D 1/005* (2013.01); *B05D 3/007* (2013.01); *B05D 3/0272* (2013.01); *B05D 3/144* (2013.01); *B05D 7/546* (2013.01); *B29D 11/00884* (2013.01); *C08G 18/227* (2013.01); *C08G 18/289* (2013.01); *C08G 18/4063* (2013.01); *C08G 18/44* (2013.01); *C08G 18/6225* (2013.01); *C08G 18/7831* (2013.01); *C08G 18/7837* (2013.01); *C08G 18/807* (2013.01); *C08G 18/8175* (2013.01); *C08J 7/042* (2013.01); *C08J 7/123* (2013.01); *C09D 5/32* (2013.01); *C09D 175/06* (2013.01); *C09K 9/02* (2013.01); *G02B 1/14* (2015.01); *G02B 5/23* (2013.01); *G02C 7/102* (2013.01); *G03C 1/73* (2013.01); *C08J 2369/00* (2013.01); *C08J 2433/14* (2013.01); *C08J 2475/06* (2013.01); *C09K 2211/14* (2013.01)

(56) References Cited

U.S. PATENT DOCUMENTS

| | | | |
|---|---|---|---|
| 5,246,499 A | 9/1993 | Peralta et al. | |
| 5,514,214 A | 5/1996 | Joel et al. | |
| 5,571,560 A | 11/1996 | Lin | |
| 5,658,501 A | 8/1997 | Kumar et al. | |
| 5,685,908 A | 11/1997 | Brytsche et al. | |
| 5,766,354 A | 6/1998 | Ohmori et al. | |
| 5,766,824 A * | 6/1998 | Batchelder | G03F 7/168 134/21 |
| 5,772,764 A | 6/1998 | Akimoto | |
| 5,961,617 A | 10/1999 | Tsang | |
| 6,129,042 A | 10/2000 | Smith et al. | |
| 6,326,054 B1 | 12/2001 | Smith et al. | |
| 6,352,747 B1 | 3/2002 | Blackburn et al. | |
| 7,624,769 B2 | 12/2009 | Bartholomew et al. | |
| 9,171,745 B2 | 10/2015 | Suzuki et al. | |
| 9,244,358 B2 | 1/2016 | Koshiyama et al. | |
| 2002/0053397 A1 | 5/2002 | Ebisawa et al. | |
| 2002/0108561 A1 | 8/2002 | Davis | |
| 2002/0112662 A1 | 8/2002 | Yamauchi et al. | |
| 2002/0197400 A1 | 12/2002 | Kao et al. | |
| 2003/0079679 A1 | 5/2003 | Ikeda et al. | |
| 2004/0072450 A1 | 4/2004 | Collins et al. | |
| 2004/0248425 A1 * | 12/2004 | Bem | B05C 5/001 438/758 |
| 2005/0058775 A1 | 3/2005 | Oku et al. | |
| 2005/0150449 A1 * | 7/2005 | Matsunaga | B05B 9/005 118/300 |
| 2007/0076301 A1 | 4/2007 | Couto et al. | |
| 2007/0084825 A1 | 4/2007 | Yashima | |
| 2007/0107657 A1 | 5/2007 | Hoffman | |
| 2008/0047488 A1 | 2/2008 | Minor et al. | |
| 2010/0062155 A1 | 3/2010 | Tajima | |
| 2011/0195183 A1 | 8/2011 | Yamashita et al. | |

FOREIGN PATENT DOCUMENTS

| | | |
|---|---|---|
| JP | 677211 A | 3/1994 |
| JP | 2001240469 A | 9/2001 |
| JP | 2002177852 A | 6/2002 |
| JP | 2004154741 A | 6/2004 |
| JP | 2004172201 A | 6/2004 |
| KR | 0169930 B1 | 1/1999 |
| KR | 100772053 B1 | 10/2007 |
| TW | 543035 B | 7/2003 |
| TW | 201025419 A1 | 7/2010 |
| WO | 2011135731 A1 | 7/2013 |

* cited by examiner

SPIN COATER FOR APPLYING MULTIPLE COATINGS TO AN OPTICAL SUBSTRATE

CROSS REFERENCE TO RELATED APPLICATION

The present application is entitled to and claims priority to U.S. Provisional Patent Application No. 61/890,045, filed Oct. 11, 2013, U.S. Provisional Patent Application No. 61/890,055, filed Oct. 11, 2013, and U.S. Provisional Patent Application No. 61/890,059, filed Oct. 11, 2013, the disclosures of which are each incorporated herein by reference in each case in their entirety.

FIELD

The present invention relates to spin coaters, such as a spin coater having at least one integrated curing station or line for applying multiple coatings to an optical substrate, in a sequence that is selected from a plurality of possible sequences.

BACKGROUND

Spin coating processes and associated spin coating machines, generally called spin coaters, are typically used to provide a uniform coating on a substrate. Spin coating processes have been used to form coated substrates, such as lenses, including optical lenses.

Existing spin coaters are typically used in a production line for the application of a single type or class of coating material, and are often followed in the production line by a pre-set curing station, such as a thermal curing oven, or a UV curing station, or an IR curing station. The type of and settings associated with the curing station depends upon the type of coating material that is applied in the spin coating station. This results in difficulty with regard to quickly switching the production line for the application of different coating materials, such as for different substrates and/or different final products, as generally the coating material reservoir and the dispensing nozzle assembly must be purged and cleaned to accommodate the change in coating material. An additional difficulty relates to the curing station, which may not be suitable for curing other coating compositions.

It would be desirable to develop new spin coating assemblies that can accommodate different coating compositions. It would be further desirable that such newly developed spin coating assemblies be able to accommodate a plurality of different coating compositions.

SUMMARY

In accordance with the present invention there is provided, a spin coater that comprises: (a) a coater bowl configured to collect excess coating material expelled from an optical substrate being coated; (b) a rotatable chuck configured to receive the optical substrate within the coater bowl and configured to rotate the optical substrate during coating; (c) a plurality of coating reservoirs, in which each reservoir contains a coating composition (of material) for selectively coating the optical substrate; and (d) an indexable coating reservoir platform containing the plurality of coating reservoirs, which is configured to index a selected coating reservoir into a dispensing position above the coater bowl. The spin coater can, with some embodiments, be used with an optical substrate.

In accordance with the present invention there is further provided, a spin coater that comprises: (a) a coater bowl configured to collect excess coating material expelled from an optical substrate being coated; (b) a rotatable chuck configured to receive the optical substrate within the coater bowl, and which is configured to rotate the optical substrate during coating; (c) at least one of coating reservoir, in which each reservoir contains a coating composition (or material) for selectively coating the optical substrate; and (d) each coating reservoir includes an elongated barrel containing a moveable piston for dispensing a coating composition from the coating reservoir. With some embodiments, each coating reservoir dispenses a coating composition through a valveless dispensing orifice positioned at the distal end of the barrel.

In accordance with the present invention there is additionally provided, a spin coater that comprises: (a) a coater bowl configured to collect excess coating material expelled from an optical substrate being coated; (b) a rotatable chuck configured to receive the optical substrate within the coater bowl, and which is configured to rotate the optical substrate during coating; (c) a plurality of coating reservoirs, in which each reservoir contains a coating composition (or material) for selectively coating the optical substrate; and (d) at least one distinct curing station, where each distinct curing station is independently configured to selectively and at least partially cure at least one coating composition applied to the optical substrate. With some embodiments, each distinct curing station independently includes at least one of: (i) a thermal curing station; (ii) a UV curing station; (iii) an IR curing station; and (iv) combinations of at least two of (i) through (iv).

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1-6 like characters refer to the same components and elements, as the case may be, unless otherwise stated.

DETAILED DESCRIPTION

Figure 1:
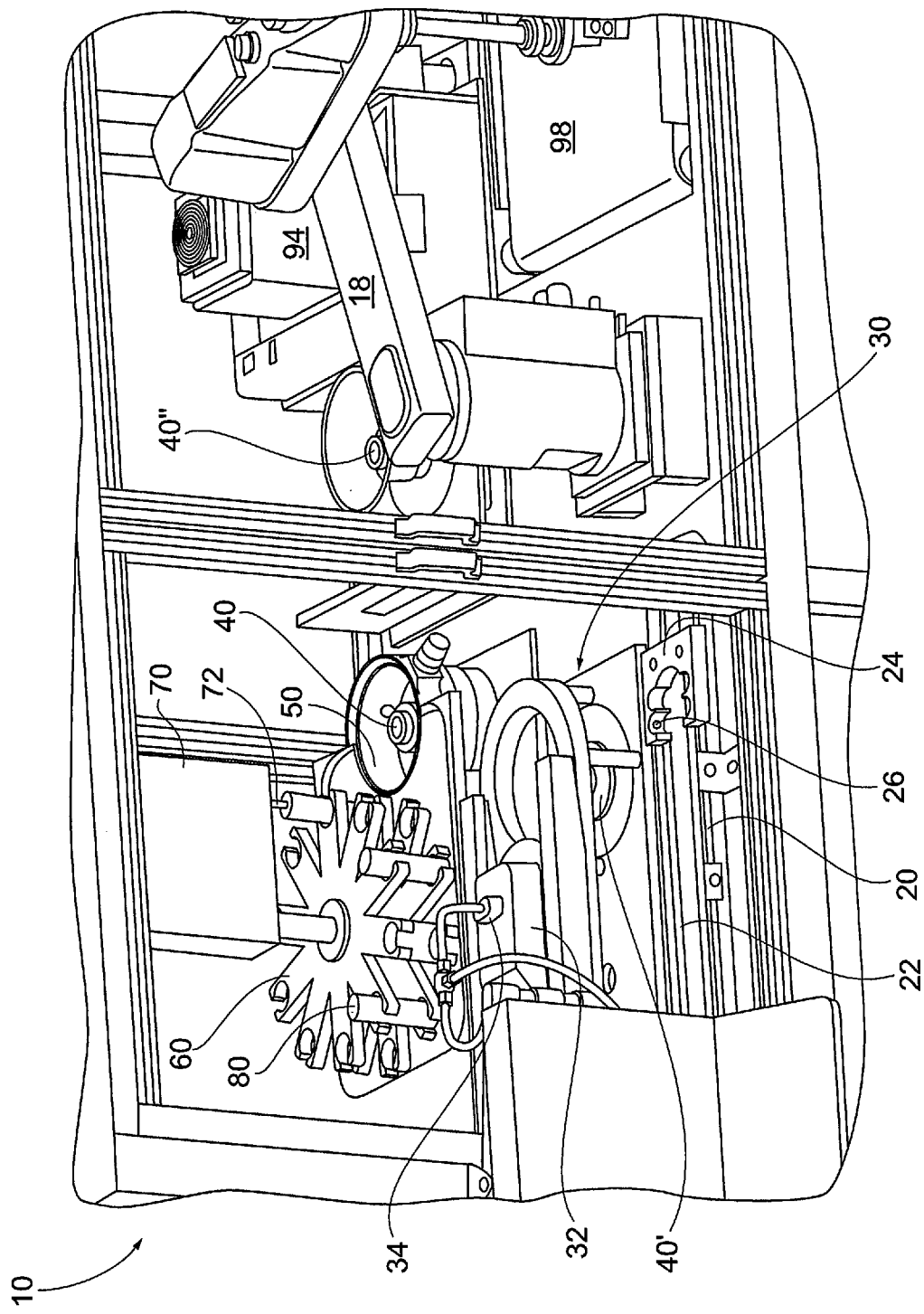
FIG. 1 is a representative perspective view of a spin coater according some embodiments of the present invention.

The terms "optical," "optically clear," and similar terms as used herein mean that the specified material (such as a substrate, film, coating, etc.) exhibits a light transmission value (transmits incident light) of at least 4 percent, and exhibits a haze value of less than 1 percent (such as, a haze value of less than 0.5 percent) when measured at 550 nanometers by, for example, a Haze Gard Plus Instrument.

As used herein the term "ophthalmic" means pertaining to or associated with the eye and vision. As used herein the term "ophthalmic substrate" means a substrate, such as a lens, that is ophthalmic. As used herein the terms "lens" and "lenses" means and encompasses at least, individual lenses, lens pairs, partially formed (or semi-finished) lenses, fully formed (or finished) lenses, and lens blanks. Examples of ophthalmic substrates, articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, protective lenses, protective visors, and protective shields.

As used herein, the term "transparent," such as used in connection with a substrate, film, material, and/or coating, means that the indicated substrate, (such as coating, film and/or material) has the property of transmitting light without appreciable scattering so that objects lying beyond are visibly observable.

As used herein, the term "coating" means a supported film derived from a flowable coating composition, which can optionally have a uniform thickness, and specifically excludes polymeric sheets. By contrast, as used herein the term "sheet" means a pre-formed film having a generally uniform thickness and which is capable of self-support. A sheet has two opposing surfaces, in which at least one surface thereof can have thereover one or more layers (including coating layers). As used herein, the terms "layer" and "film" each encompass both coatings (such as a coating layer or a coating film) and sheets, and a layer can include a combination of separate layers, including sub-layers and/or over-layers. In accordance with some embodiments, and as used herein, the term "coating" means, within appropriate context, the process of applying a coating composition (or material) to the substrate to form a coating (or coating layer).

As used herein, the terms "cure," "cured," and related terms, means that at least a portion of the polymerizable and/or crosslinkable components that form a curable composition are at least partially polymerized and/or crosslinked. In accordance with some embodiments, the degree of crosslinking can range from 5% to 100% of complete crosslinking. In accordance with some further embodiments, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Unless otherwise indicated, all numbers expressing dimensions, physical properties, and so forth used in the specification and claims, are to be understood as modified in all instances by the term "about."

As used herein, the term "valve-less" means being free of a valve (not including a valve).

As used herein, the spin coater of the present invention is also referred to as a flexible spin coater for purposes including, but not limited to, indicating the flexibility the spin coater of the present invention can provide with regard to applying a plurality of coating compositions in a sequence that can be selected from a plurality of coating application sequences.

As used herein the term "IR" means infrared, such as infrared radiation.

As used herein the term "UV" means ultraviolet, such as ultraviolet radiation.

The various embodiments and examples of the present invention as presented herein are understood to be illustrative of the present invention and not restrictive thereof and are non-limiting with respect to the scope of the invention.

Figure 2:
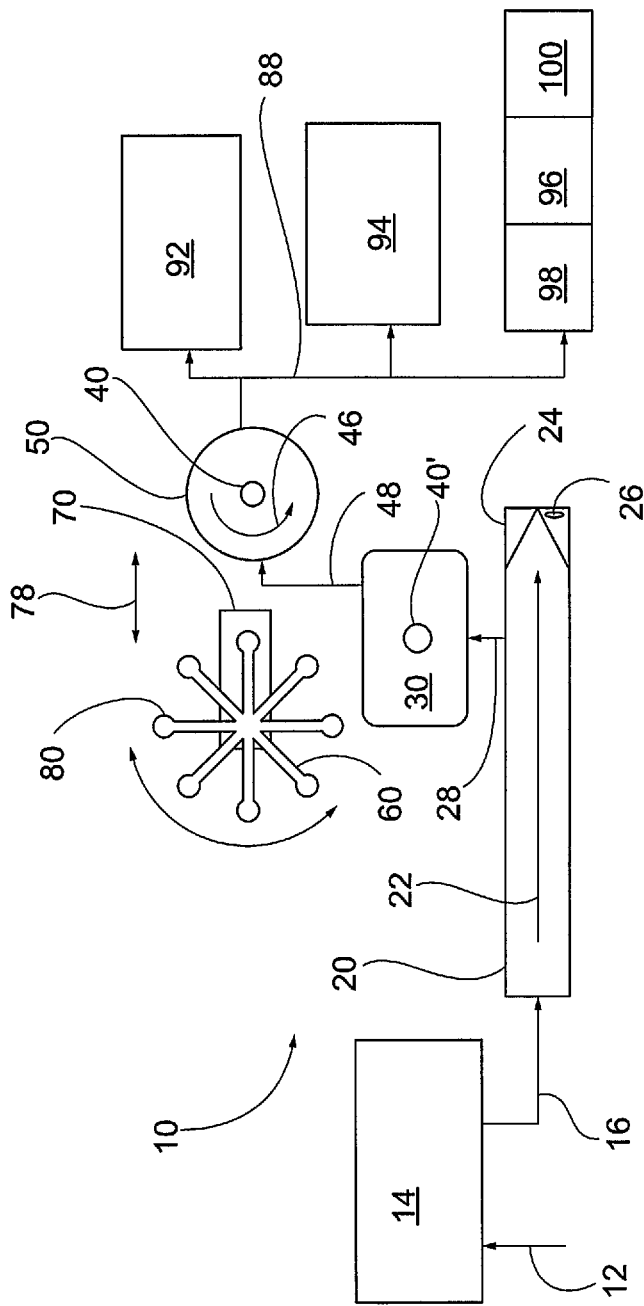
FIG. 2 is a representative schematic plan view of a modified embodiment of the spin coater of FIG. 1.

With non-limiting reference to the drawings, FIG. 1 is a representative perspective view of a flexible spin coater 10 that includes, or has associated therewith, integrated curing stations, for selectively applying multiple coatings to an optical substrate in accordance with some embodiments of the present invention. With reference to FIG. 2, there is depicted a representative schematic plan view of a modified embodiment of the spin coater 10 of FIG. 1.

The flexible spin coater 10 as described herein, and in accordance with some embodiments, provides a low cost, small scale (such as, producing up to 100 coated optical substrates per hour) top side spin coating machine that can include a surface pretreatment station (such as, but not limited to, plasma pretreatment station) that cleans, coats (utilizing one or more of multiple coatings and combinations of coatings), and which utilizes one or more of several different curing methods (such as, UV, IR, and/or thermal curing apparatae) or combinations thereof. The spin coater of the present invention can, with some embodiments, be operated with the formation of minimal waste streams and/or waste materials.

The spin coater of the present invention can have any suitable dimensions, which can, with some embodiments, be appropriately scaled to the space, such as a room, in which the spin coater is placed for operation. With some embodiments, the spin coater of the present invention, including an enclosure, a control panel, and a filter (such as a high-efficiency particulate air or HEPA filter) has a width of from 0.76 meters (m) to 1.52 m (2.5 to 5 feet), or from 0.91 m to 1.37 m (3 to 4.5 feet); a length of from 0.91 m to 3.66 m (3 to 12 feet), or from 0.91 m to 3.05 m (3 to 10 feet), or from 1.22 m to 2.13 m (4 to 7 feet); and a height of from 1.83 m to 3.05 m (6 to 10 feet), or from 2.13 m to 2.74 m (7 to 9 feet).

The flexible spin coater 10 can, with some embodiments, be used to coat a variety of substrates, such as, but not limited to, optical substrates. Examples of optical substrates that can be coated with the spin coater of the present invention include, but are not limited to, plano lenses, prescription lenses, which in each case can be finished lenses, unfinished lenses, or lens blanks. In accordance with some further embodiments, the lenses coated with the spin coater of the present invention, have a diameter of 50-85 mm with varied back curvatures (such as, from ½ base up to 10 base). For reference a finished lens is one that will have the front and rear surface of the lens formed (commonly by grinding and polishing) to the desired contour, while a semi-finished lens will have only one (e.g., the top) surface finished. Both finished and unfinished lens often undergo further processing such as coating with photochromic material, hard coats, tinting layers, planarizing layers (generally categorized as coating layers providing optical, aesthetic or protective properties) as well as edging to fit the desired shape or other processing to couple to a frame or support structure.

The optical substrate that is coated with the method of the present invention can, with some embodiments, be formed from and correspondingly include organic materials, inorganic materials, or combinations thereof (for example, composite materials).

Examples of organic materials that can be used as optical substrates in accordance with various embodiments of the present invention, include polymeric materials, such as homopolymers and copolymers, prepared from the monomers and mixtures of monomers disclosed in U.S. Pat. No. 5,962,617 and in U.S. Pat. No. 5,658,501 from column 15, line 28 to column 16, line 17. For example, such polymeric materials can be thermoplastic or thermoset polymeric materials, can be transparent or optically clear, and can have any refractive index required. Examples of such monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

With some embodiments of the present invention, the optical substrate can be an ophthalmic substrate. Examples of organic materials suitable for use in forming ophthalmic substrates include art-recognized polymers that are useful as ophthalmic substrates, such as organic optical resins that are used to prepare optically clear castings for optical applications, such as ophthalmic lenses.

Examples of inorganic materials that can be used as optical substrates with some embodiments of the present invention include glasses, minerals, ceramics, and metals. With some embodiments, the optical substrate can include glass. In other embodiments, the optical substrate can have a reflective surface, for example, a polished ceramic substrate, metal substrate, or mineral substrate. In other embodiments, a reflective coating or layer (e.g., a metal layer, such as a silver layer) can be deposited or otherwise applied to a surface of an inorganic or an organic substrate to make it reflective or to enhance its reflectivity.

Optical substrates that can be used with the method according to some embodiments of the present invention can also include untinted, tinted, linearly polarizing, circularly polarizing, elliptically polarizing, photochromic, or tinted-photochromic substrates. As used herein with reference to optical substrates, the term "untinted" means optical substrates that are essentially free of coloring agent additions (such as conventional dyes) and have an absorption spectrum for visible radiation that does not vary significantly in response to actinic radiation. Further, with reference to optical substrates the term "tinted" means substrates that have a coloring agent addition (such as conventional dyes) and an absorption spectrum for visible radiation that does not vary significantly in response to actinic radiation.

As used herein, the term "circularly polarizing" with reference to optical substrates refers to optical substrates that are adapted to circularly polarize electromagnetic radiation. As used herein, the term "elliptically polarizing" with reference to optical substrates refers to optical substrates that are adapted to elliptically polarize electromagnetic radiation. Further, as used herein, with reference to optical substrates, the term "tinted-photochromic" means optical substrates containing a coloring agent addition as well as a photochromic material, and having an absorption spectrum for visible radiation that varies in response to at least actinic radiation. Thus, for example, a tinted-photochromic substrate can have a first color characteristic of the coloring agent and a second color characteristic of the combination of the coloring agent and the photochromic material when exposed to actinic radiation.

With some embodiments, an initial step in the use of the flexible spin coater 10 of the invention involves loading (see reference or step 12 of FIG. 2) the optical substrates into a surface treatment chamber, such as plasma chamber 14. The plasma surface treatment conducted within chamber 14 can be selected from one or more art-recognized plasma surface treatment methods including, but not limited to, corona treatment, atmospheric plasma treatment, atmospheric-pressure treatment, flame plasma treatment, and/or chemical plasma treatment. With some embodiments, the surface treatment conducted in chamber 14 is an oxygen plasma treatment. The loading step 12 allows an operator to visually inspect the optical substrates (or lenses) for defects or damage before the process is begun. If dirt is visible the operator can clean the lenses by hand prior to placement into the plasma chamber 14 where they will undergo plasma treatment. The hand cleaning step can, with some embodiments, be conducted with deionized air. With some alternative embodiments, the operator can wipe the lenses, as needed, with one of several cleaning agents such as alcohol (such as isopropanol), or aqueous isopropanol, or an aqueous detergent.

The surface treatment process involves, with some embodiments, treating the surface of the optical substrate to promote wetting and enhance adhesion of a coating that is subsequently applied to and formed thereon. The chamber 14, with some embodiments, includes a series of edge engaging optical substrate holders to allow the maximum surface treatment of the optical substrates in chamber 14. Chamber 14, with some embodiments, is operated under conditions of reduced atmosphere, and correspondingly the surface treatment is conducted as a batch process operation in chamber 14.

Plasma treatments, including corona treatments, provide a clean and efficient method of altering the surface properties of an optical substrate, such as roughening and/or chemically altering one or more surfaces thereof, without altering the bulk properties of the optical substrate. With some embodiments, one or more inert gases (such as, but not limited to, argon and/or nitrogen) and/or one or more reactive gases (such as, but not limited to, oxygen, CO, and/or $CO_2$) can be used as the gas in chamber 14 from which the plasma is formed. Inert gases, with some embodiments, roughen the surface of optical substrates. Reactive gases, such as oxygen, with some embodiments can both roughen and chemically alter the surface exposed to the plasma by, for example, forming hydroxyl and/or carboxyl groups on the treated surface.

With some embodiments, the use of oxygen in the plasma surface treatment process can provide an effective degree of physical roughening and chemical modification of the surface of the optical substrate, which can improve adhesion without detrimentally effecting other properties, such as optical properties, of the optical substrate. Atmospheric air can also be used to form the plasma gas, and with some embodiments is a reactive gas. The extent of the surface roughening and/or chemical modification is, with some embodiments, a function of the plasma gas and the operating conditions of chamber 14, including the length of time of the surface treatment. With some embodiments, the optical substrates are exposed to a plasma surface treatment for 1 to 5 minutes, such as in chamber 14, which results in the formation of surface treated optical substrates that are further processed in spin coater 10. Surface treatment of the optical substrates within chamber 14 can also remove foreign contaminants present on the surface thereof. The presence of certain surface contaminants can, with some embodiments, undesirably reduce the surface energy of the surface of the optical substrate. A high surface energy, which can result after removal of the surface contaminants, promotes coating wetting, with some embodiments.

Following the plasma surface treatment in chamber 14, the surface treated optical substrates are removed at step 16 and can optionally be subjected to visual and/or automated inspection prior to placement onto a loading unit 20 of spin coater 10. The optical substrates are forwarded along a path of travel 22 on loading unit 20, which can be achieved by way of a conveyer, such as a conveyer belt. The optical substrates are forwarded along path of travel 22, until they engage a positioning pocket 24. The loading unit 20 queues the optical substrates, and prevents the optical substrates from damaging each other (such as by engaging/rubbing/knocking each other) while sequentially presenting and introducing each individual optical substrate into positioning pocket 24. The edges of the positioning pocket 24 are configured, such as angled, to position each individual optical substrate in a pre-selected position (such as a centered position or location) relative to the width of the positioning pocket. Positioning pocket 24 also includes, with some embodiments, at least one (such as at least two) proximity sensors (such as beam breaking sensors 26) that identify the leading edge and/or trailing edge of each individual optical substrate, and cause the conveyor to stop when the optical substrate is sensed and determined to be properly positioned (such as centered) within positioning pocket 24.

Positioning pocket 24 allows spin coater 10 to be automated with a pick and place robotic arm 18 (shown only in FIG. 1). Robotic arm 18 engages the optical substrate in a manner that maintains a known center position of the optical substrate, such as within about 2 mm, throughout the process steps conducted in spin coater 10. The known center position of the optical lens can be so maintained as a result of a combination of, the accuracy of robotic arm 18, and the proper initial positioning of the optical substrate by and within positioning pocket 24, with some embodiments. The use of a pick and place robotic arm 18 allows spin coater 10 to be fully automated within the envelope of robotic arm 18, and minimizes damage to, such as marking of, the surfaces of the optical substrate, compared to a manual process, such as a fully manual process.

The optical substrate can be wet or dry when picked up by robotic arm 18. With some embodiments, when wet, the optical substrate includes one or more wet coating layers thereon that are not hard, such as being tacky and/or uncured. With some further embodiments, when dry, the optical substrate is free of coating layers or includes one or more dry coating layers that are hard (and not tacky), such as being cured. In accordance with some embodiments, a lower portion of the gripper elements of robotic arm 18 engage and secure the optical substrate during wet pick up thereof (when the optical substrate is wet). With some further embodiments, upper portions of the gripper elements of robotic arm 18 engage and secure the lens during dry pick up thereof (when the optical substrate is dry).

The placement at step 12 into chamber 14 and removal from chamber 14 at step 16 can each be automated with a pick and place robotic arm, which moves the positioning pocket 24 (or other positioning mechanism) upstream of chamber 14, with some embodiments. The use of an operator at chamber 14 allows for visual inspection of the optical substrates both before placement in and after removal from chamber 14, and allows for human oversight and control over spin coater 10 during operation thereof, with some embodiments. Art-recognized automated inspection procedures and equipment can be used to inspect the optical substrates before and/or after treatment thereof in chamber 14 in conjunction with or in place of manual inspection thereof, with some embodiments.

Figure 3:
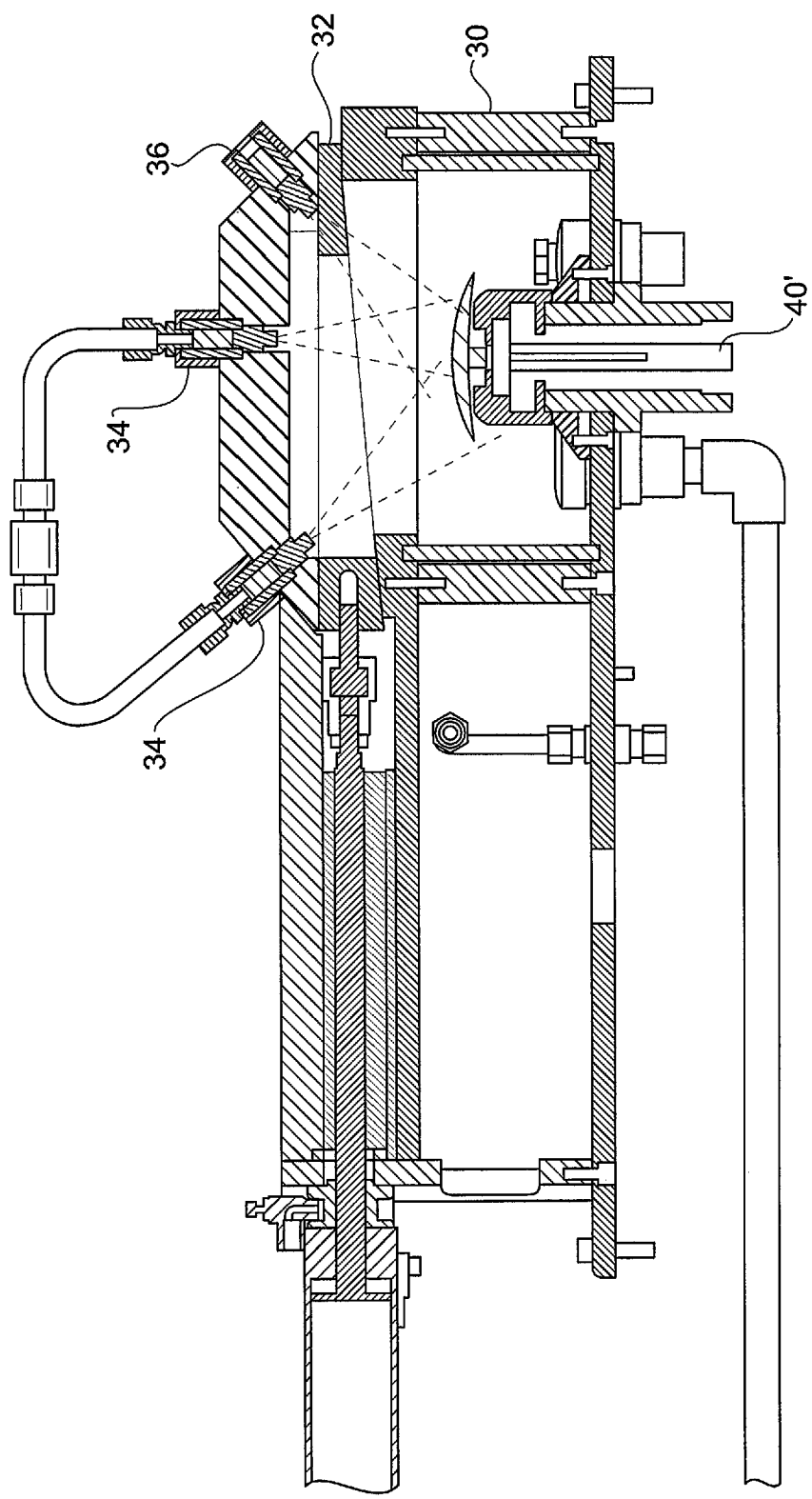
FIG. 3 is representative a section view of a washing/drying station of the spin coater of FIG. 1.

Robotic arm 18 moves the optical substrate in step 28 to an optional washing and drying station 30, shown in FIG. 3. With some embodiments, robotic arm 18 places the optical substrate on a rotatable chuck 40', which can be a rotatable vacuum chuck 40' with some embodiments, within the washing and drying station 30. Rotatable chuck 40' is programmable and can rotate at high speeds, such as up to 4,000 rpm, with some embodiments. After securing the optical substrate onto rotatable chuck 40', a top 32 is slid to a closed position aligning high pressure water spray nozzles 34 with the optical substrate held on the rotating chuck 40'. The high pressure water spray nozzles 34 are angled relative to the surface including the edge of the optical substrate held on the rotating vacuum chuck 40' for the purposes of cleaning the optical substrate, with some embodiments. In this manner the entire upper surface and edge of the plasma treated optical substrate can be cleaned, such as with deionized water under conditions of elevated pressure, such as about 1,000 psi, with some embodiments. Rotatable chuck 40' can rotate during spray washing to assure even cleaning of the optical substrate surface. The washing parameters, such as liquid pressure, washing time, and rotating speed can be programmable and can vary based on parameters, such as the type and/or size of the optical substrate, plasma treatment, and/or subsequent coating processes.

Following washing, the optical substrate can, with some embodiments be dried in station 30 by one or more drying methods including, but not limited to, high speed rotation of the rotatable chuck 40' and/or high speed air nozzle(s) 36, which can be filtered air nozzles. The drying parameters can be programmed in a manner similar to those associated with the washing parameters, with some embodiments.

Following washing and drying in station 30, the top 32 is slid to an open position, robotic arm 18 reengages the optical substrate on rotatable chuck 40', and robotic arm 18 moves the optical substrate in step 48 to the rotatable chuck 40 in the coater bowl 50, which can be a rotatable vacuum chuck 40 with some embodiments. The rotatable chuck 40 is configured to receive the optical substrate within coater bowl 50 and configured to rotate the optical substrate during coating, the speed and timing of which can vary depending upon parameters including, but not limited to, the coating and optical substrate.

The coater bowl 50 is configured to collect: excess coating material expelled from the optical substrate that is coated therein; and/or expelled during purging of the reservoirs 80 discussed further herein; and/or cleaning materials that are periodically utilized to clean coater bowl 50 (such as at the end of the week, or day, or shift). The spin coater 10 of the present invention is effective as a once through system for small scale production, with some embodiments. A once through system means that the collected materials need not be recirculated and thus the collected material from coater bowl 50, can be removed through a drain not shown, need not be segregated or processed for reuse. A once through system allows for the efficient change out of distinct coating materials, with some embodiments.

Figure 4:
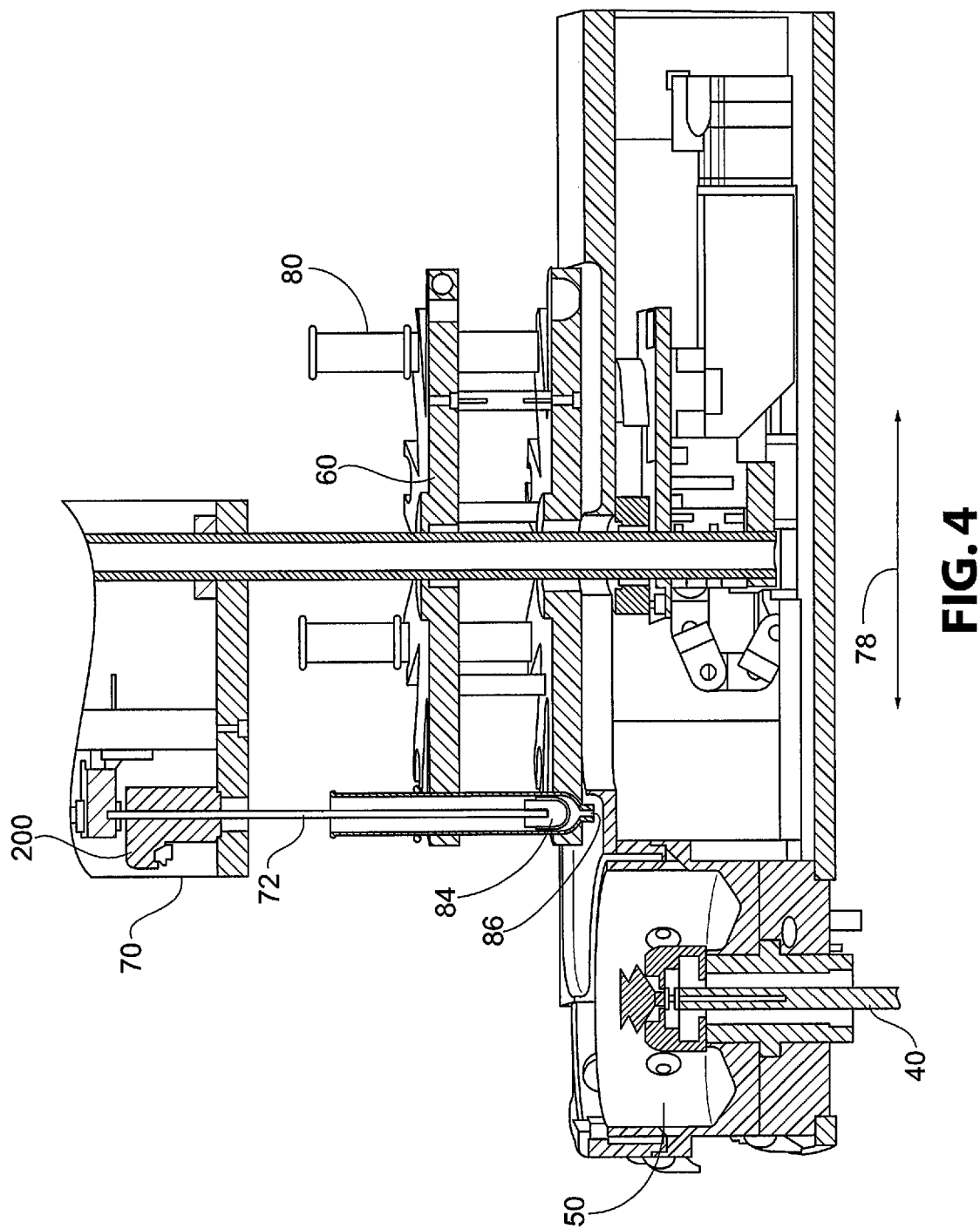
FIG. 4 is a representative section view of an indexable coating reservoir platform containing a plurality of coating reservoirs and a dispensing unit of the spin coater of FIG. 1.

The spin coater 10 of the present invention includes, with some embodiments, an indexable coating reservoir platform 60 containing a plurality of coating reservoirs 80. Indexable coating reservoir platform 60 is configured to index a selected coating reservoir 80 into a dispensing position above coater bowl 50, so the coating reservoir 80 can be dispensed with a dispensing unit 70 at the dispensing position as shown in FIG. 4. The dispensing unit 70 is engagable with the selected coating reservoir 80 in the dispensing position to dispense a select (or pre-determined) amount of coating material from the engaged and selected coating reservoir 80.

The indexable coating reservoir platform 60 is a rotatable carousel having distinct circumferential positions, in which each distinct circumferential position reversibly receives one of the plurality of disposable coating reservoirs 80. The carousel can, with some embodiments include eight- or ten-stations. The carousel can have other numbers of positions for reservoirs 80, with some further embodiments, such as, but not limited to, eighteen- or twenty-stations. The rotating carousel as shown represents an efficient embodiment for forming and operating the indexable coating reservoir platform 60. Other indexing arrangements, however, can be used in accordance with the spin coater of the present invention. For purposes of non-limiting illustration, a linearly moving rack or line of reservoirs 80 can be used for forming platform 60, with no limit on the number of distinct reservoirs 80 that can be present in such an arrangement. The motor rotating the platform 60 can utilize a variety of art-recognized alignment mechanisms, such as a spring biased detent locking mechanism, to assure the held reservoirs 80 are moved into precise and predetermined indexed positions such that the reservoir 80 is in the dispensing position below and aligned with the dispensing unit 70.

Figure 5:
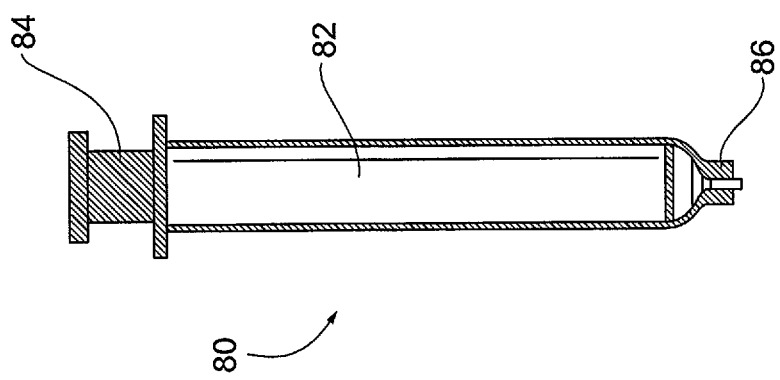
FIG. 5 is a representative section view of a coating reservoir of the spin coater of FIG. 1.

FIG. 5 is a representative section view of an individual coating reservoir 80 of the flexible spin coater 10. Each coating reservoir 80 includes an elongated barrel 82 containing a moveable piston 84 for dispensing of coating material from the coating reservoir 80, and in which advancement of moveable piston 84 of the selected coating reservoir 80 in the dispensing position dispenses coating material from the selected coating reservoir 80. With some embodiments and with further reference to FIG. 5, each coating reservoir 80 is formed as a disposable plastic syringe and thus each coating reservoir 80 dispenses coating through a valve-less dispensing orifice 86 at the distal end of the barrel. Plastic syringes are commercially available and are particularly well suited to form reservoirs 80 due to the precise dispensing characteristics associated there-with. Caps (not shown) on the rear surface and across the orifice 86 can be used for shipping of filled reservoirs 80, with some embodiments. The caps can also be reapplied for removal and storage of reservoirs 80, with some further embodiments.

With some embodiments, barrel 82 of each reservoir 80 allows for the printing of human and/or machine readable identification indicia on the optical substrate, such as, but not limited to bar codes, QR codes, and/or matrix codes. Machine readable identification indicia can include information relating to, the coating identification, the coating parameters associated with a particular coating material, and/or the type of optical substrate, with some embodiments. The coating parameters can include, with some embodiments, one or more of: the unit dosage of coating material for a given substrate (such as from 0.2 ml to 0.6 ml for conventional lens coatings); the rate of dispensing; the dispensing pattern (such as, start in the center of the vacuum chuck held substrate and move out, vice versa, or some other varied dispensing position); the speed of the vacuum chuck 40 (sometimes called spread speed); and/or the time of rotation (also called spread time).

The narrow orifice 86 of reservoir 80 (with some embodiments in combination with the movable piston 84) allows the coating material to be held in reservoir 80 and dispensed in the absence of a valve. With some embodiments, the valve-less dispenser of reservoir 80 substantially eliminates (except for a single purge drip/drop) priming which is necessary with other spin coater dispensers, and greatly reduces the amount of waste formed during operation of spin coater 10.

Dispensing unit 70 includes a rod 72 aligned with the selected reservoir 80 in the dispensing position and is configured to selectively advance the moveable piston 84 of the selected coating reservoir 80 in the dispensing position to dispense a select (or predetermined) unit amount of coating material from the engaged selected coating reservoir 80. With some embodiments, rod 72 is a screw, such as an elongated screw. With some embodiments, the select (or predetermined) unit amount of coating material dispensed is from 0.2 ml to 4 ml, or from 0.2 to 1 ml, or from 0.2 ml to 0.6 ml. The unit amount includes a coating amount and a purge amount (such as a drop) and can vary depending on parameters, including but not limited to, the coating material, the substrate characteristics, the desired coating thickness, and coating protocol.

With some embodiments, the selected coating reservoir 80 has therein an amount of coating material that is less than that required to coat two optical substrates, but more than that required to coat a single optical substrate (i.e., less than two unit amounts). This remainder amount of coating material (i.e., less than two unit amounts) can with some embodiments be: (i) expelled from coating reservoir 80 for disposal, such as into a disposal receptacle or drain; or (ii) dispensed from coating reservoir 80 onto a single optical substrate. After expelling or dispensing the remainder amount of coating material, reservoir 80 is empty and substantially free of coating material, and can be disposed of as solid waste, with some embodiments.

The dispensing unit 70, with some embodiments, includes a motor 200, such as a linear stepper motor or the like, for precisely advancing the moveable piston 84 of a selected coating reservoir to dispense there-from a predetermined amount of coating material. Dispensing unit 70 also senses, with some embodiments, the position of piston 84, via rod 72 or other device, both before and after use, so that the amount of coating material residing in each specific reservoir 80 can be calculated and tracked by spin coater 10. Dispensing unit 70 lifts rod 72 out of barrel 82 to allow for indexing of the carousel of platform 60 to select a distinct reservoir 80, with some embodiments. A reservoir 80 moving out of the dispensing position will not be empty, but will have remaining therein coating material for selective later use, with some embodiments.

In accordance with some embodiments of the present invention, rod 72 is a stationary rod and the motor is moveable, such as vertically moveable, along rod 72. The motor can include an extension (not shown) that engages abuttingly with piston 84. Controllable movement of the motor, such as vertically downward, along the stationary rod serves to drive piston 84 into reservoir 80, which results in dispensing of a select (or predetermined) amount of coating material from orifice 86, with some embodiments.

In operation, the indexable coating reservoir platform 60, the reservoirs 80, and the unit 70 are moveable as a unit, shown schematically at 78, at least between: (i) a purge position, where the selected coating reservoir 80 in the dispensing position is above the coater bowl 50 but is not above the optical substrate or lens; and (ii) at least one dispensing position, where the selected coating reservoir in the dispensing position above the coater bowl is above the optical substrate. The coater bowl 50 can be constructed to include a trough or extension that extends to a point aligned with the purge position. In the purge position the movable piston 84 is advanced by rod 72 of unit 70 to dispense a minimal purging drop of the coating material to clear the outer surface of the meniscus of coating material at orifice 86 of valve-less reservoir 80. The outer surface of the meniscus can be exposed to air during non-use of the coating material in a given reservoir 80, which can result in oxidation and/or fouling the meniscus, thus requiring purging thereof. A single drop is all that is required to prime the coating material distribution system by purging the possibly non-homogeneous portion of the coating material from orifice 86, with some embodiments. Following the initial purge drop, the indexable coating reservoir platform 60, the reservoirs 80, and the unit 70 are moveable as a single unit, shown schematically at 78, to at least one dispensing position where the selected coating reservoir 80 in the dispensing position above the coater bowl 50 is above the optical substrate.

With some embodiments, orifice 86 is dimensioned so that the coating material within barrel 82 of reservoir 80 does not flow out therefrom, in the absence of movable piston 84 being positioned (or moved) within barrel 82 towards orifice 86. With some embodiments, orifice 86 is circular and has a diameter of less than or equal to 3.18 mm (⅛ inch).

The movement 78 of the selected dispensing reservoir 80 allows the spin coater 10 to accommodate a variety of dispensing protocols for coating the optical substrate on rotatable chuck 40 within coater bowl 50. With some embodiments, the coating material from the selected dispensing reservoir 80 can be dispensed on the optical substrate at the center, and/or at one or more select positions across the surface of the optical substrate (such as in a line, spiral, and/or concentric circles, across/on the upper surface of the optical substrate), and then the rotatable chuck 40 is engaged to spin the applied coating material to form a coating layer having substantially uniform thickness. In accordance with some further embodiments, concurrently with spinning of rotatable chuck 40, the coating material from the selected dispensing reservoir 80 is dispensed on the optical substrate at the center, and/or at one or more select positions across the surface of the optical substrate to form a uniform coating. Any desired combination of these dispensing and spinning protocols can be used with the spin coater 10. Additionally the dispensing rate and the spinning speed can also be varied throughout the process, with some embodiments. Intermittent dispensing and/or spinning of the vacuum chuck can used with some embodiments. The dispensing protocols are, with some embodiments, based upon parameters including, but not limited to, the substrate composition and/or surface treatment thereof, the coating material applied, and/or the desired final coating parameters.

The indexable platform 60 allows the spin coater 10 to apply a single or multiple coating layers on the optical substrate without removing the lens from the rotatable chuck 40. With some embodiments and for purposes of non-limiting illustration, in a first stage a first coating layer is applied using one selected reservoir 80, then the carousel is indexed, such that in a second stage a second coating material is applied over the first coating layer from a distinct/separate reservoir 80. The indexing of the carousel can be done with the platform 60 moved away from alignment of the reservoirs 80 with the optical substrate, so no stray drips from intermediate reservoirs 80 interfere with the desired coating protocol, and so that in the second stage the second coating material can be properly purged before dispensing over the optical substrate. Having two or more coating stages allows the spin coater of the present invention to apply and form numerous combinations of stacked coating layers, in which each coating layer thereof has the same or different composition and/or the same or different thickness relative to an adjacent (or abutting) coating layer.

In accordance with some embodiments of the present invention, the spin coater includes or has integrated therewith at least one distinct curing station (such as curing stations 92, 94, and 96) for selectively and independently curing (such as at least partially curing) each coating applied to the optical substrate. The spin coater includes or has integrated therewith, with some further embodiments, a plurality of distinct curing stations (such as two or more curing stations, such as curing stations 92, 94, and 96) for selectively and independently curing (such as at least partially curing) each coating applied to the optical substrate. Following the application of the desired coating material at coating bowl 50, robotic arm 18 reengages the optical substrate and moves it, at step 88, to a designated curing station (92, 94, or 96). With some embodiments of the present invention, each curing station independently includes at least one of: (i) a thermal curing station 96; (ii)

a UV curing station 94; (iii) an IR curing station 92; and (iv) combinations of at least two of (i), (ii), and (iii).

Figure 6:
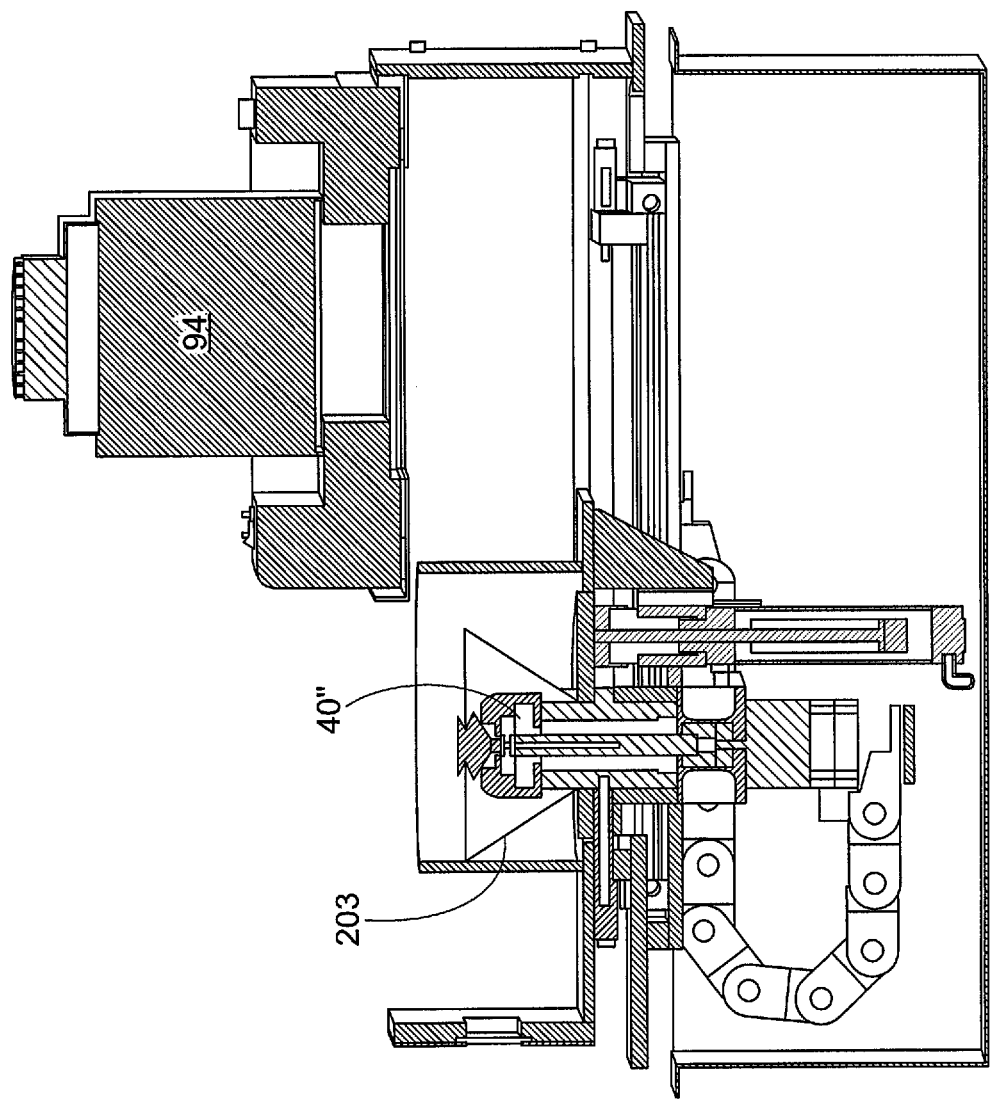
FIG. 6 is a representative section view of a curing station of the spin coater of FIG. 1.

FIG. 6 is a representative section view of a UV curing station 94 of the flexible spin coater 10 showing a sliding drawer with a work piece holding a rotatable chuck 40" (which can be a rotatable vacuum chuck 40" with some embodiments) for selective receipt of a desired optical substrate to be cured. A concave or angled reflective mirror 203 surrounds rotatable chuck 40" to assist or improve in edge curing. With a coated optical substrate on rotatable chuck 40" of UV curing station 94, the drawer is closed and a shutter opened to expose the coated optical substrate to UV light (such as from a mercury or metal halide bulb) within UV curing station 94. Rotatable chuck 40" can rotate at slow speeds within UV curing station 94 to further assure a uniform cure, with some embodiments. The curing time within UV curing station 94 can vary depending on, for example, the particular coating. The IR curing station 92 can have a similar construction as UV curing station 94, but includes an appropriate IR source. The curing time within IR curing station 92 can also vary depending on, for example, the particular coating. Each curing station, with some embodiments, can include therein an atmosphere selected from an inert atmosphere (such as, but not limited to, argon and/or nitrogen) and/or a reactive atmosphere (such as, but not limited to, oxygen, CO, and/or $CO_2$).

The thermal curing station 96, with some embodiments, is accompanied with a throughput conveyor 98 and a discharge or accumulation area 100. In the thermal curing station the optical substrates to be thermally cured are placed on the input conveyer, such as side-by-side on conveyor 98. The speed of the conveyor is selected so the coated optical substrates have a desired temperature exposure within curing station 96. The oven of thermal curing station 96 can, with some embodiments be an electric oven and/or a gas fired oven (such as a natural gas fired oven). The curing times and temperature profiles can vary depending on, for example, the coating that is to be cured. With some embodiments, the coated optical substrates are exposed to a temperature of 115°–135° C. for 20-40 minutes, such as 30 minutes at 125° C. for 30 minutes within the thermal curing station. Following at least partial curing, the coated optical substrates are forwarded to an accumulation area 100 designed to accommodate a desired number of coated optical substrates with no edges touching there-between (such as, but not limited to, up to 30 coated optical substrates).

With some embodiments, conveyor 98 in concert with robotic arm 18 is used for egress of at least partially cured coated optical substrates from the IR curing station and/or the UV curing station. With some embodiments, a separate exit conveyor (not shown) is used to bypass the thermal curing station 96 for purposes of delivering coated optical substrates to accumulation area 100.

In accordance with some further embodiments, an optical substrate can be washed, then coated, then re-washed, and then subsequently coated with the same or different coating material before curing. With some additional embodiments, a coated and cured optical substrate can be returned from a curing station (92, 94, or 96) to: (i) the washing and drying station; and/or (ii) coater bowl 50 for the application thereto of a subsequent coating material. An optical substrate can, with some embodiments, be moved from accumulation area 100 back to loading unit 20 for the subsequent application thereto or one or more coating materials.

The spin coater of the present invention can, with some embodiments, be used for the production of optical substrates, which each independently have the same or a different coating stack formed thereon. The spin coater of the present invention can be operated so as to produce a minimum of waste, with some embodiments. The spin coater of the present invention can, with some embodiments, be at least partially automated, and optionally incorporated into art-recognized product tracking and control systems.

The present invention has been described with reference to specific details of particular embodiments thereof. It is not intended that such details be regarded as limitations upon the scope of the invention except insofar as and to the extent that they are included in the accompanying claims.

What is claimed is:

1. A spin coater comprising:
   (a) a coater bowl configured to collect excess coating material expelled from an optical substrate being coated;
   (b) a rotatable chuck configured to receive the optical substrate within the coater bowl and configured to rotate the optical substrate during coating;
   (c) a plurality of coating reservoirs, each reservoir containing a coating material for selectively coating the optical substrate; and
   (d) an indexable coating reservoir platform containing the plurality of coating reservoirs and configured to index a selected coating reservoir into a dispensing position above the coater bowl,
   wherein the indexable coating reservoir platform is a rotatable carousel comprising a plurality of distinct circumferential positions, wherein each distinct circumferential position is configured to reversibly receive one of the plurality of coating reservoirs, and
   wherein said rotatable carousel, with said plurality of coating reservoirs, is laterally moveable as a single unit so as to position said selected coating reservoir into said dispensing position above the coater bowl.

2. The spin coater of claim 1, wherein the indexable coating reservoir platform further comprises a dispensing unit at the dispensing position, wherein the dispensing unit is engagable with the selected coating reservoir in the dispensing position to dispense a select amount of coating material from the engaged selected coating reservoir.

3. The spin coater of claim 2, wherein each coating reservoir comprises a moveable piston for dispensing of coating material from the coating reservoir, and wherein the dispensing unit is configured to advance the moveable piston of the selected coating reservoir in the dispensing position to dispense a select amount of coating material from the engaged selected coating reservoir.

4. The spin coater of claim 3, wherein the dispensing unit comprises a motor that is configured to advance the moveable piston of said selected coating reservoir, in the dispensing position, to dispense said select amount of coating material.

5. The spin coater of claim 1, wherein the indexable coating reservoir platform, with said plurality of coating reservoirs, is laterally moveable as said single unit from, (i) a purge position, where the selected coating reservoir in the dispensing position above the coater bowl is not above the optical substrate, to (ii) at least one dispensing position, where the selected coating reservoir in the dispensing position above the coater bowl is above the optical substrate.

6. The spin coater of claim 1, wherein each coating reservoir comprises an elongated barrel having therein a moveable piston for dispensing of coating material from the coating reservoir, and wherein advancement of the moveable piston of the selected coating reservoir, in the dispensing position, dispenses coating material from the selected coating reservoir.

7. The spin coater of claim 6, wherein each coating reservoir dispenses coating material through a valve-less dispensing orifice positioned at a distal end of the barrel.

8. The spin coater of claim 1, wherein each coating reservoir is a disposable plastic syringe.

9. The spin coater of claim 1, wherein the spin coater is integrated with at least one curing station, where each curing station is independently configured to at least partially cure at least one coating material applied to the optical substrate.

10. The spin coater of claim 9, wherein each distinct curing station independently comprises at least one of, (i) a thermal curing station, (ii) a UV curing station, (iii) an IR curing station, and (iv) combinations of at least two of (i), (ii), and (iii).

11. The spin coater of claim 10, further comprising a robotic placement arm configured to move each optical substrate between the rotatable chuck within the coater bowl, and each curing station.

12. The spin coater of claim 11, further comprising an input positioning pocket that positions the optical substrate for engagement with the robotic arm, wherein said input positioning pocket is engagable with the optical substrate before initial engagement of the optical substrate with the robotic arm.

13. The spin coater of claim 12, further comprising a washing and drying station, wherein said washing and drying station is configured to selectively wash and dry each optical substrate, and is accessible by the robotic arm.

14. The spin coater of claim 1, wherein the spin coater is integrated with a plurality of curing stations, where each curing station is independently configured to at least partially cure at least one coating material applied to the optical substrate.

* * * * *